United States Patent [19]
Paul

[11] 3,762,442
[45] Oct. 2, 1973

[54] DIRECTIONAL CONTROL VALVE WITH PORTATIVE ELECTROMAGNETIC LATCH MECHANISM

[75] Inventor: John C. Paul, W. Richmond Heights, Ohio

[73] Assignee: Parker-Hannifin Corporation, Cleveland, Ohio

[22] Filed: Jan. 14, 1972

[21] Appl. No.: 217,734

[52] U.S. Cl.............. 137/625.2, 267/168, 251/65, 251/297, 137/66
[51] Int. Cl...... F16k 11/07, F16f 1/06, F16k 31/00
[58] Field of Search................ 251/65, 297; 137/66, 137/67, 625.2, 625.3, 625.6–69; 267/168

[56] References Cited
UNITED STATES PATENTS

| | | | |
|---|---|---|---|
| 3,221,770 | 12/1965 | Faisandier............... | 137/625.68 X |
| 3,421,549 | 1/1969 | Webb.......................... | 251/65 X |
| 2,456,078 | 12/1948 | Paille ......................... | 137/66 |
| 2,299,649 | 10/1942 | Paille ......................... | 137/66 |
| 2,372,537 | 3/1945 | Wantz......................... | 137/66 X |
| 3,348,561 | 10/1967 | MacLennan.............. | 137/66 |
| 3,556,155 | 1/1971 | McWilliams............... | 137/625.3 X |

*Primary Examiner*—Henry T. Klinksiek
*Attorney*—Walter Maky

[57] ABSTRACT

A spool type directional control valve characterized in that one end of a spring-centered spool has operatively connected thereto a portative electromagnetic latch mechanism which retains the spool in a selected operating position to which it is moved from its spring-centered neutral position until the spool is released for spring movement to neutral position either by de-energization of said latch mechanism or by manual force applied on the spool overcoming the net retaining force of the latch mechanism. In connection with a three-position four-way float spool which has a first operating position on one side of the neutral position, a second operating position on the other side of the neutral position, and a float position beyond said second operating position, and which has an electromagnetic latching mechanism to latch the spool at said first and float positions, the spring-centering mechanism comprises two preloaded springs both of which are additionally compressed in moving the spool from neutral position to the first position and only one of which is additionally compressed when the spool is moved from neutral position to the second position and both of which springs are additionally compressed in moving the spool from the second position to the float position whereby the spring return forces are approximately balanced at the first position and the float position and additionally the preload of the spring which is not additionally compressed at said second position provides a sensory position indicator to indicate the movement of the spool from neutral position to the second position. Accordingly, when the spool is released by manual force from its latched first or float positions, the manual forces are approximately equal whether the spool is to be released from the first position or from the float position.

8 Claims, 3 Drawing Figures

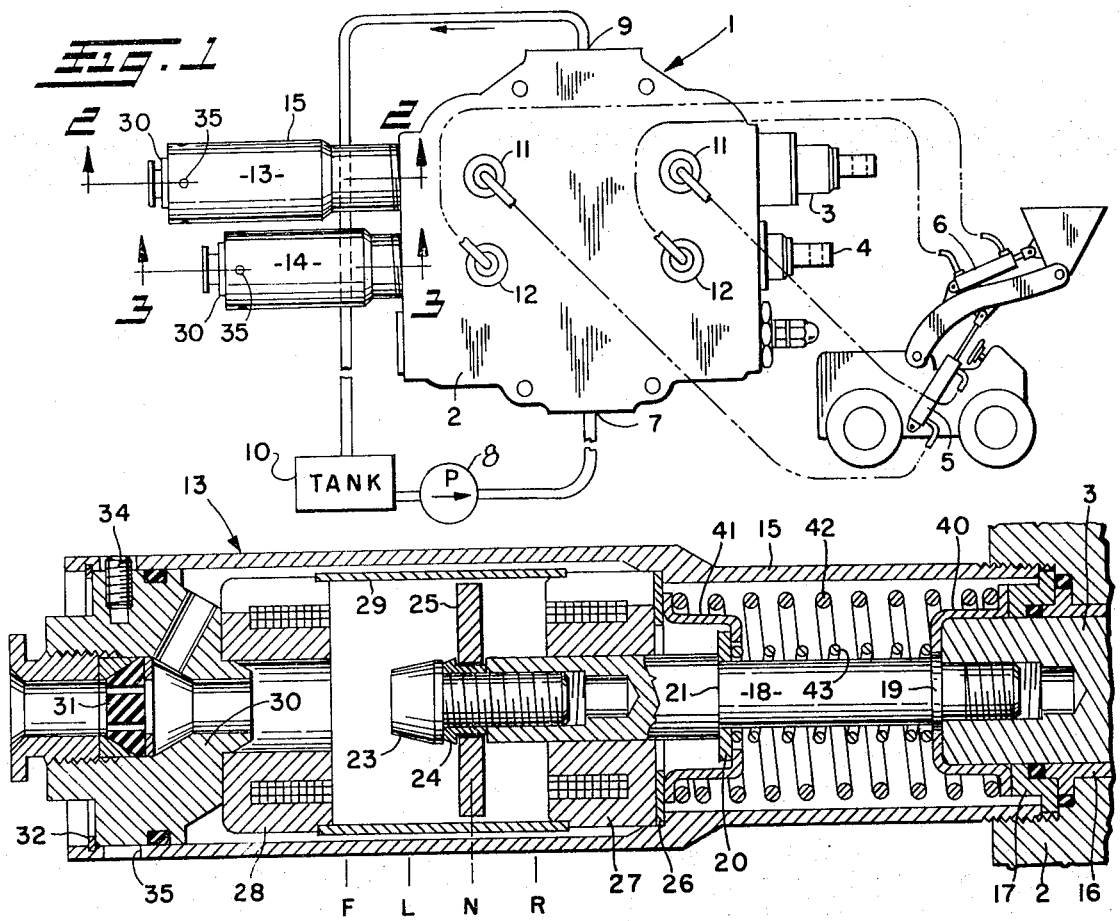
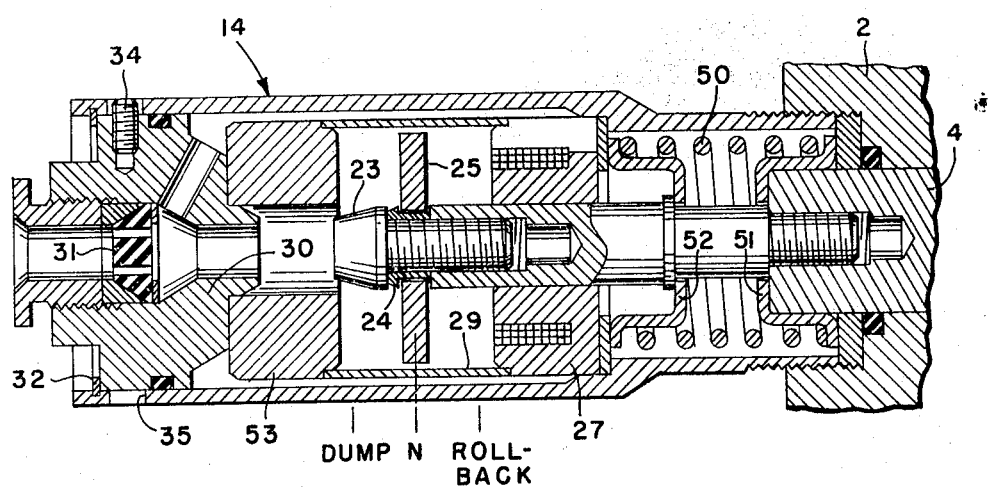

3,762,442

DIRECTIONAL CONTROL VALVE WITH PORTATIVE ELECTROMAGNETIC LATCH MECHANISM

BACKGROUND OF THE INVENTION

It is known to provide a solenoid operated spool valve assembly wherein switches are closed and opened to energize and de-energize the solenoids thereof to effect movement of the spool to one or more operating positions or to release the spool for spring movement from an operating position to neutral inactive position but the solenoids are what are termed "tractive electromagnets" which are designed to exert a force on the spool through a substantial distance thus to do work or in effect to provide for power actuation of the spool from neutral position to operating position. However, the closing of a switch contact does not provide any degree of manual control of the spool and hence the spool will be at once moved from neutral position to operating position responsive to closing of the associated switch and therefore the operator of the equipment controlled by the spool valve assembly cannot throttle the flow of fluid to the equipment nor can he stop the actuation of the spool at some intermediate position.

SUMMARY OF THE INVENTION

The present invention relates to a spool valve assembly which has associated therewith portative electromagnet means to latch the spool in one or more of its operating positions, the spool having a self-aligning magnetizable plate thereon which engages an electromagnet in the valve housing and being released from latched position for spring return movement thereto to neutral inactive position either by de-energizing the electromagnet or by exertion of manual force on the spool to overcome the latching force minus the spring return force.

Another characterizing feature of the present invention is that in a spool having a first operating position on one side of neutral position and second and third operating positions on the other side of neutral position, the spring return mechanism functions as a second position indicator to impose an abrupt increase in resistance to spool movement beyond said second position while yet the spring return forces at the first and third positions are approximately equal.

BRIEF DESCRIPTION OF THE DRAWING

FIG. 1 is an elevation view of a two-spool directional control valve for controlling, for example, the actuation of the boom and bucket motors of a front end loader and having the present electromagnetic latching mechanism associated with each spool; and FIGS. 2 and 3 are cross-section views on enlarged scale taken substantially along the lines 2—2, and 3—3, FIG. 1 illustrating electromagnetic latching mechanisms for a four-way float spool and a four-way spool respectively.

DETAILED DESCRIPTION OF THE INVENTION

In FIG. 1 the reference numeral 1 denotes a conventional directional control valve having a housing 2 with pools 3 and 4 reciprocable therein to control, for example, the boom and bucket motors 5 and 6 of a front end loader or the like. The housing 2 has an inlet port 7 connected to pump 8, a return port 9 connected to tank 10, and pairs of motor ports 11 and 12 connected to the respective motors 5 and 6.

For purposes of illustration the spool 3 is a four-way float spool which as well known in the art, when used to actuate a boom motor 5, has a neutral N position, a raise position R on one side of the neutral N position and lower L and float F positions on the other side of neutral N position. The spool 4 is a four-way spool which, when used to actuate a bucket cylinder 6, has a neutral N position, a DUMP position on one side of neutral N position and a ROLLBACK position on the other side of neutral N position. For examples of spool type directional valves having four-way float spools 3 and four-way spools 4 reference may be had to the following patents: Stacey U.S. Pat. No. 3,195,559, Stacey U.S. Pat. No. 3,251,277, Schmiel U.S. Patent No. 3,000,397, Stacey U.S. Pat. 3,132,668, Schmiel U.S. Pat. No. 3,160,174, Stacey U.S. Pat. No. 3,262,467, and Stacey U.S. Pat. No. 3,299,903.

The spools 3 and 4 have electromagnetic latching and spring-centering mechanisms 13 and 14 associated therewith, said mechanisms being illustrated in detail in FIGS. 2 and 3 respectively.

Referring now in detail to the electromagnetic latching mechanism and spring-centering mechanism 13 as employed in connection with the four-way float spool 3, the same comprises, as shown in FIG. 2, a housing 15 which is screw connected to he valve housing 2 to clamp in place spool guide and seal retainer rings 16 and 17. Screwed into the end of the spool 3 is a rod 18 which clamps a washer 19 against the end of the spool 3 and which has a washer 20 slidable thereon toward and away from the shoulder 21 on said rod 18. Secured to the end of the rod 18 by means of the screw 23 and bushing 24 is an iron plate 25 which has, say 0.005 inch to 0.015 inch radial and axial play on bushing 24 to render said plate 25 self-aligning.

The housing 15 has therein a locating washer 26 and adjacent said washer 26 is a first electromagnet 27 which when energized is adapted to retain the iron plate 25 in engagement therewith when the spool 3 is manually moved to the right to the raise R position. A second electromagnet 28 is axially spaced from said first electromagnet 27 by means of a spacer sleeve 29 and when said second electromagnet 28 is energized it will be operative to hold the iron plate 25 thereagainst when the spool 3 is shifted to the left to the float F position. The electric leads, not shown, will extend from the respective electromagnets 27 and 28 toward the left and through the radial opening in the electromagnet retainer 30 and through openings in a seal washer 31, the retainer 30 being held by the snap ring 32 and being held against rotation by means of the set screw 34 which extends into a selected one of several holes 35 in the housing. Thus, as the retainer 30 is pushed into the housing 15 it may be turned to take up slack in the leads and then held by inserting the set screw 34 through an appropriate one of the holes 35. Between the guide and seal retainer ring 17 and the washer 26 are two opposed spring guide and follower sleeves 40 and 41 having radially outturned flanges between which a main spring 42 is compressed. The sleeve 41 has an inturned flange portion which radially overlaps the washer 20 on the rod 18 and the sleeve 40 has an inturned flange portion between which and washer 20 another spring 43 is compressed. As now evident, when the spool 3 is moved to the raise R position, both springs 42 and 43 will be additionally compressed. When the spool 3 is moved to the lower L position only the main spring 42 is additionally compressed. When it is attempted to move the spool 3 beyond the lower L position toward the float F position, the washer 20 being in engagement with the electromagnet 27 effects a noticeable increase in the resistance to continued left hand movement of the spool 3 from the lower L position because both springs 42 and 43 are additionally compressed to resist such movement. The preload of the spring 43 thus provides a position indicator so that the operator may sense when the spool 3 is at the lower L position.

Finally, when the spool 3 is moved so that the iron plate 25 engages the electromagnet 28 the latter, if energized will retain the spool 3 in its float F position either until the electromagnet 28 is de-energized or until the operator applies manual force on the spool 3 exceeding the magnetic holding force less the spring return force of the two springs 42 and 43. As soon as the plate 25 has been moved away from the electromagnet by such manual force, or when the electromagnet is de-energized, both springs 42 and 43 will be effective to return the spool 3 to the lower L position and the spring 42 will be effective to return the spool 3 from the lower L position to neutral N position.

The spring arrangment shown in FIG. 2 makes it possible to approximately equalize the spring forces at the raise R and float F positions while providing a substantial feel at the lower L position so that the operator can determine when the spool 3 has been actuated to the lower L position. As an example, the main spring 42 in neutral N position may have a preload of 30 pounds which increases to 37 pounds when the spool 3 is moved from neutral N to raise R position. Since the feel spring 43 is also compressed in moving the spool 3 from neutral N to raise R position it may have a 15 pound preload which increases to 20 pounds at the raise R position. Accordingly, in shifting the spool 3 from neutral N to raise R the initial preload of both springs is 45 pounds and at the R position the total spring force is 57 pounds. Now, in moving the spool 3 from neutral N to lower L position only the main spring 42 is compressed from its initial preload of 30 pounds to 37 pounds at the lower L position. Accordingly, with a 15 pound preload of the spring 43 if the operator applies force on the spool 3 tending to move it past the lower L position he will encounter an abruptly increased force of 52 pounds at such lower L position, i.e., the sum of the main spring 42 force of 37 pounds and the 15 pound preload of the spring 43. In additionally compressing the main spring 42 during movement of the spool from the lower L to the float F position the spring load of the main spring 42 will increase from 37 to 43 pounds while the load spring force will increase from 15 to 20 pounds, or a total of 63 pounds spring force at the float F position. Accordingly, if the electromagnets have a holding force of 120 pounds, a force of about 60 pounds (i.e., from 57 to 63 pounds) will have to be exerted on the spool 3 to move the iron plate 25 away from either electromagnet 27 or 28. Generally, the spool 3 will be actuated by a lever which may have say a 6:1 ratio and therefore the operator will have to exert only about a 10 pound pull or push on the pool operaing lever in order to overcome the net magnetic holding force. Once the magnetic holding force has been overcome, the springs 42 and 3 will then continue the movement of the spool 3 back to neutral N position without exertion of force by the operator.

Referring now to FIG. 3, the electromagnetic latching mechanism 14 is quite similar to that just described in relation to FIG. 2 except that in a four-way spool 4, the spool has only two operating positions oneither side of the neutral N position and hence a convenional centering spring 50 may be employed including spring guide and follower sleeves 51 and 52 between which the spring 50 is compressed to provide an initial preload and then a final desired spring load at either operating position, i.e. DUMP or ROLLBACK in the case of the bucket motor 6. If electromagnetic latching is desired at only one operating position of the spool one electromagnet may be omitted and replaced by a blank member 53. Obviously, this also applies to the latching mechanism 13 for the four-way float spool 3 wherein either electromagnet 27 or 28 may be replaced by such blank member 53. To avoid need of repeating the description of the constrction of the lach mechanism 14 the same reference numerals as used in FIG. 2 are used in FIG. 3 to denote the same or similar parts.

The loose fit of the plate 25 on bushing 24 makes the plate 25 self-aligning or universally tiltable so that it will intimately engage the plane end face of the electromagnet 27 or 28 despite departure of said end face from exact perpendicularity with respect to the axis of the spool 3 or 4.

I claim:

1. A directional control valve comprising a housing having an inlet port for connection with a fluid pressure source, a return port for connection with a fluid reservoir, and a motor port for connection with a fluid motor; a spool manually movable in said housing from a neutral position whereat fluid communication between said inlet port and said motor port is blocked to operating positions whereat said motor port is selectively communicated with said inlet port or said return port to control actuation of such fluid motor; spring means biasing said spool to neutral position; and electromagnetic latch means operative when energized to retain said spool in one of its operating positions; said electromagnetic latch means comprising a tubular body secured to said housing coaxially around an end portion of said spool and said spring means and containing an electromagnetic coil therein disposed coaxially of said spool and axially beyond said spring means, and a magnetizable member tiltably connected to one end of said spool for movement therewith into intimate engagement with an end of said coil to be retained thereby until released therefrom either by deenergization of said coil or by manual force on said spool whereby said spool is returned to neutral position by said spring means.

2. A directional control valve comprising a housing having an inlet port for connection with a fluid pressure source, a return port for connection with a fluid reservoir, and a pair of motor ports for connection with a double acting fluid motor; a spool manually movable in said housing from a neutral position whereat communication between said motor ports and said inlet port is blocked to first and second operating positions whereat either motor port is communicated with said inlet port and the other motor port is communicated withsaid return port to control actuation of said motor, said spool having a float position beyond said second operating position whereat said motor ports are communicated with each other and with said return port; spring means biasing said spool to neutral position; and electromagnetic latch means operative when energized to retain said spool in either said first position or said float position, said electromagnetic latch mean comprising a tubular body secured to said housing coaxially around an end portion of said spool and said spring means and containing a pair of axially spaced apart electromagnetic coils therein axially beyond said spring means, and a magnetizable member between said coils connected to one end of said spool for movement therewith into engagement with either of said coils to be retained thereby until released therefrom either by deenergization of the coil engaged thereby or by manual force on said spool whereby said spool is returned to neutral position by said spring means; said spring means imposing markedly increased resistance to continued movement of said spool from said second position to said float position thus to indicate when said spool has reached said second position as it is moved thereto from neutral position, the magnitudes of the spring return forces at said first and float positions being approximately equal.

3. In combination with a spool type directional control valve having a housing in which a spool is manually movable from a neutral position to an operating position to control actuation of a fluid motor operatively connected to said housing; spring means adjacent said housing biasing said spool to neutral position; and portative electromagnetic latching means axially beyond said spring means comprising an electromagnetic coil secured to said housing coaxially of said spool, and a magnetizable plate tiltably connected to said spool and being intimately engageable with an end of said coil upon movement of said spool to said operating position and being retained in engagement therewith until released therefrom either by deenergization of said coil or by manual force on said spool whereby said spool is returned to neutral position by said spring means.

4. In combination with a spool type directional valve having a housing in which a spool is manually movable from a neutral position to first and second operating positions on opposite sides of said neutral position and to a third position beyond said second operating position to control actuation of a fluid motor operatively connected to said housing; spring means adjacent said housing biasing said spool to neutral position; and portative electromagnetic latching means comprising a pair of axially spaced apart electromagnetic coils secured to said housing coaxially of said spool and axially beyond said spring means, and a magnetizable plate tiltably connected to said spool to intimately engage either coil upon movement of said spool to either said first position or said third position to retain said spool at either position in opposition to said spring means.

5. The combination of claim 4 wherein said spring means comprises at least two pre-loaded springs both of which are additionally compressed during movement of said spool from said neutral position to said firt position, one of which is additionally compressed during movement of said spool from said neutral position to said second position and from said second position to said third position, and the other of which is additionally compressed only during movement of said spool from said second position to said third position to provide an abrupt increase in opposition to movement of said spool at said second position thus to serve as a sensory indicator of said second position; said springs having spring rates selected so that the spring return forces are approximately equal at said first and third positions.

6. The combination of claim 5 wherein said coils have substantially equal magnetic holding force on said plate whereby approximately equal manual forces on said spool will disengage said plate from said coils for spring return movement of said spool to neutral position.

7. In combination with a spool type directional valve having a housing in which a spool is manually movable from a neutral position to first and second operating positions on opposite sides of said neutral position and to a third position beyond said second operating position to control actuation of a fluid motor operatively connected to said housing; spring means biasing said spool to neutral position; said spring means comprising at least two pre-loaded springs both of which are additionally compressed during movement of said spool from said neutral position to said first position, one of which is additionally compressed during movement of said spool from said neutral position to said second position and from said second position to said third position, and the other of which is additionally compressed only during movement of said spool from said second position to said third position to provide an abrupt increase in opposition to movement of said spool at said second position thus to serve as a sensory indicator of said second position; said springs having spring rates selected so that the spring return forces are approximately equal at said first and third positions.

8. The combination of claim 7 wherein said spool has a spring follower thereon engaged with one end of said other spring, said follower having an axial lost-motion connection with said housing to avoid additional compression of said other spring during movement of said spool from neutral position to said second operating position.

* * * * *